United States Patent [19]
Murray et al.

[11] Patent Number: 5,628,845
[45] Date of Patent: May 13, 1997

[54] PROCESS FOR FORMING HYDRATABLE, FLEXIBLE REFRIGEMENT MEDIA

[75] Inventors: Joseph C. J. Murray; Jonathan S. Browne, both of Mobile, Ala.

[73] Assignee: Thermal Products, Inc., Northridge, Calif.

[21] Appl. No.: 535,543

[22] Filed: Sep. 28, 1995

[51] Int. Cl.$^6$ .................................................. B32B 31/00
[52] U.S. Cl. .................. 156/64; 156/164; 156/358; 156/359; 156/361; 156/495; 156/498; 156/547; 156/548; 156/549; 118/667
[58] Field of Search .................. 156/64, 164, 361, 156/358, 359, 495, 498, 543, 547, 548, 549; 118/413, 419, 667, 692

[56] References Cited

U.S. PATENT DOCUMENTS

| | | | |
|---|---|---|---|
| 3,911,186 | 10/1975 | Trotman | 156/64 X |
| 4,011,124 | 3/1977 | Baxter | 156/358 |
| 4,572,752 | 2/1986 | Jensen et al. | 156/64 |
| 4,772,354 | 9/1988 | Olsen et al. | 118/667 X |
| 4,773,959 | 9/1988 | Smith et al. | 156/361 X |
| 4,806,183 | 2/1989 | Williams | 156/64 |
| 4,851,069 | 7/1989 | Packard et al. | 156/64 X |
| 5,265,401 | 11/1993 | Guger et al. | 53/546 |

FOREIGN PATENT DOCUMENTS

WO/9302861  2/1993  WIPO.

*Primary Examiner*—David A. Simmons
*Assistant Examiner*—Paul M. Rivard
*Attorney, Agent, or Firm*—Veal & Associates

[57] ABSTRACT

The present invention utilizes a controlled pressure application system to insure that the proper pressure is applied in a lamination of permeable and semi-permeable roll mounted sheets into a cellular sheet structure. The present invention uses a pressure roller mounted on a carriage which is movable horizontally radially of a heated roll by a controllable linear actuator such that variable and closely controlled pressure may be applied to a web passing between the heated roll and the carriage mounted pressure roller. Additionally, the present invention uses a precisely controllable fluid heated pressure roller and a precisely controllable fluid cooled cooling roller acting as a heat sink for the pressure roller to maintain a precise temperature gradient across the web at the nip. In addition to controlling temperature and pressure on the web, the present invention further controls tension on the web to prevent polymer dissipation, and controls speed of the web such that pressure and temperature dwell time are precisely controlled. Furthermore all of the parameters of operation of the apparatus are electronically recorded for future use.

19 Claims, 3 Drawing Sheets

PROCESS FOR FORMING HYDRATABLE, FLEXIBLE REFRIGEMENT MEDIA

FIELD OF THE INVENTION

The present invention relates primarily to the packaging industry and more particularly to that aspect of the industry concerned with temperature sensitive shipment containers. In greater particularity, the present invention related to a method and apparatus for manufacturing a refrigerant media containing a superabsorbent polymer laminated in individual cells between elongated continuous sheets of thermoformable media. The laminate may include a permeable and impermeable sheet such that the superabsorbent polymer can absorb water within the cell and be frozen to provide a substitute for ice and dry ice.

BACKGROUND

The present invention constitutes an improvement over a prior device which was the subject of international patent application number PCT/US92/06486 filed by George Barrett (deceased) which is incorporated herein by reference. Mr. Barrett's experimental device as set forth in the above application verified that the basic process of laminating the media into cells for the aforesaid purposes could be accomplished. However, the apparatus and method practice by the apparatus were somewhat crude and were not amenable to substantial commercialization. Specifically, the Barrett machine provided gross temperature and pressure application for the laminating process and was susceptible to product degradation. Accordingly, the Barrett apparatus was unacceptable for actual practice in commercial applications and left much to be desired in terms of efficiency of manufacture of the end product.

SUMMARY OF THE INVENTION

It is the object of the present invention to provide a method and apparatus for the efficient formation of a laminated cellular fabric containing a superabsorbent polymer for use as a refrigerant media.

As an adjunct to the forgoing object it is an object of the present invention to control the temperature, pressure and dwell time parameters associated with the formation of the laminated cellular product such that reproducible production runs can be recorded and utilized to optimize the performance of the apparatus.

Yet another object of the invention is to improve the safety of the operation the apparatus in the process.

It will be appreciated that these and other objects and advantages are accomplished in the novel improvements to the original apparatus. The present invention utilizes a controlled pressure application system to insure that the proper uniform pressure is applied. More specifically, the Barrett application used a gravity based pressure roll system utilizing five rollers with the film interwoven therebetween, thereby negating any possibility pressure control. The present invention uses a pressure roller mounted on a carriage which is movable horizontally radially of a heated roll by a controllable linear actuator such that variable and closely controlled pressure may be applied to a web passing between the heated roll and the carriage mounted pressure roller.

Additionally, the present invention is a marked improvement over the Barrett apparatus in terms of temperature control in that the present invention uses a precisely controllable fluid heated pressure roller and a precisely controllable fluid cooled cooling roller acting as a heat sink for the pressure roller to maintain a precise temperature gradient across the web at the nip.

In addition to controlling temperature and pressure on the web, the present invention further controls tension on the web to prevent polymer dissipation, and controls speed of the web such that pressure and temperature dwell time are precisely controlled. Furthermore, all of the parameters of operation of the apparatus are electronically recorded for future use. The specific manner in which each of these improvements, which are individually and jointly novel, are accomplished is disclosed in the accompanying description of the preferred embodiment and the drawings referred to therein.

BRIEF DESCRIPTION OF THE DRAWINGS

Apparatus embodying features of and usable in the practice of my invention are depicted in the accompanying drawings, which form a portion of this disclosure and wherein.

DESCRIPTION OF THE PREFERRED EMBODIMENT

Figure 1:
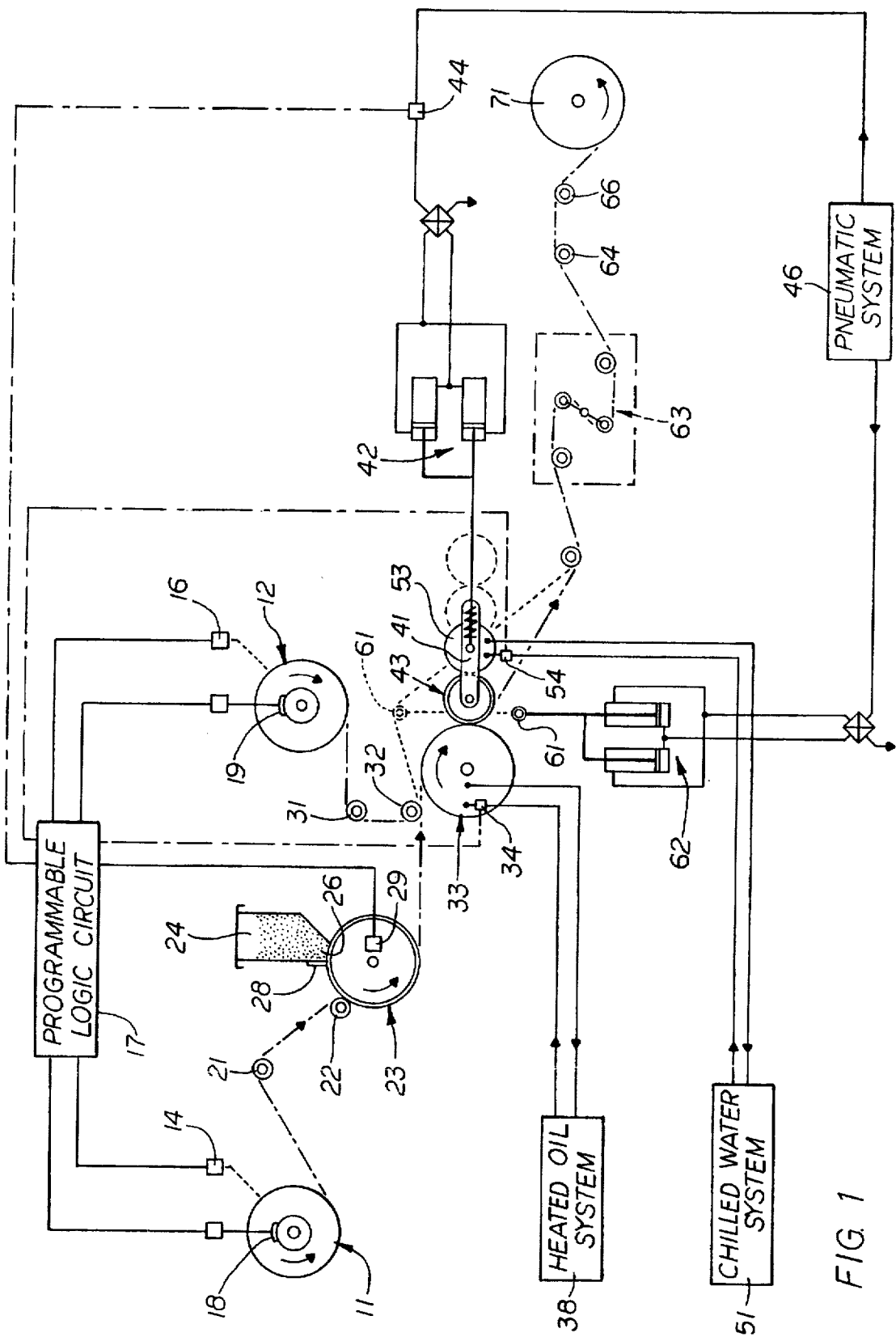
FIG. 1 is a side elevational view of a web forming machine including our improvements.

Referring to the Figures for a clearer understanding of the invention, it will be seen in FIG. 1 that we employ two separate supply rolls of media identified at numerals 11 and 12. It will be appreciated that the frame structure of the device is not shown in as much as the details of how the components are supported are not media to the understanding of the invention. Supply roll 11 contains a length of impermeable thermally formable media such as a plastic film, for example a 1.22 mil one side sealable biaxially oriented polypropylene film or a 1.75 mil coextruded multiply film including layers of high density polyethylene, a tie layer and a sealant layer. The foregoing examples are not intended to be limiting in as much as the apparatus and process may be used with a number of medias which lend themselves to thermal and pressure bonding.

Supply roll 12 carries a length of a semi-permeable media such as a non-woven fabric. As used herein and as generally understood non-woven fabrics are made directly from fiber rather than yarn by bonding or interlocking of fibers or both, accomplished by mechanical, chemical, or solvent means and combinations thereof. The non-woven fabric and the plastic film are both preferentially a standard width, such as sixty inches.

In each instance, the rolls 11 and 12 are mounted on cores, as generally understood in the industry, for mounting on air controlled shafts having an expandable portion within the core such that the core may be gripped from the inside. Such shafts are known in the art and further description thereof is not deemed necessary to an understanding of the invention. The use of such shafts enables the present machine to exercise positive control over the roll to avoid slippage of media around the supply shaft which lead to breakage and non-feed situations in the prior art machinery. The present invention provides bearing mounts for the shafts which allow transverse movement of the rolls on the shafts to insure alignment for processing through the machine.

Supply rolls 11 and 12 are monitored ultrasonically by an associated ultrasonic sensor 14 or 16 which face the rolls and are set to measure the decreasing diameter of the roll as the media is consumed in the process. The resulting data is transmitted to a programmable logic circuit 17 or other programmable controller where the data is used to calculate the proper feed rate and in turn control the application of braking to the respective rolls through the use of air actuated brakes 18 and 19. Proper control of the feed rate and braking controls the tension in the supply media web and proper control of tension provides a smoother less vibratory transition of the media to the sealing units. The importance of this is best understood after referring to FIG. 1 and the further explanation of the process.

Figure 3:
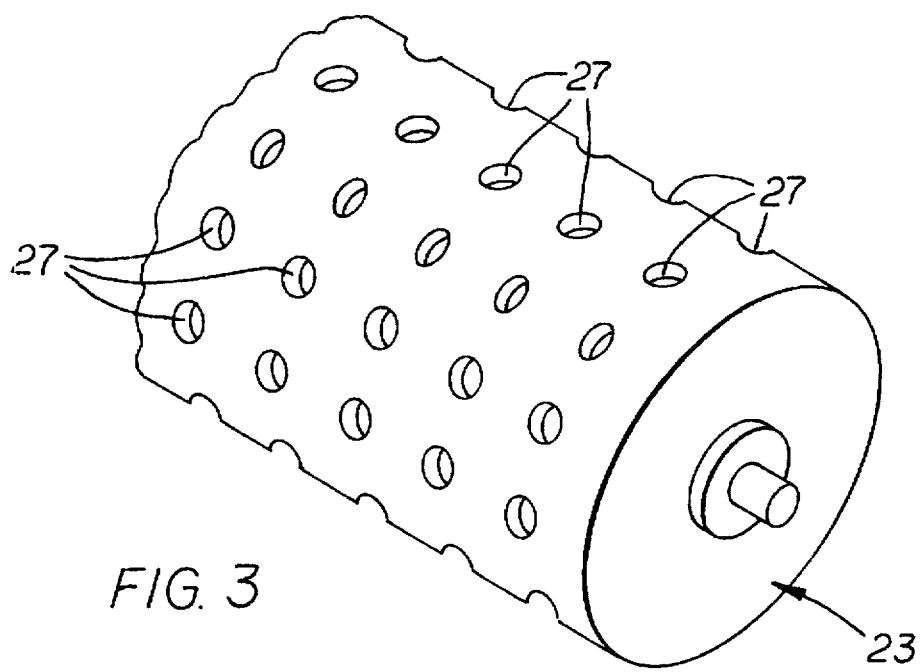
FIG. 3 is a perspective view of the dispersing roller surface.

Plastic film from roll 11 is entrained over a smoothing roll 21 thence to an application roller 22 which is parallel and adjacent a driven dispersing roller 23. Dispersing roller is dimpled as shown in FIG. 3 and is mounted for rotation directly beneath feed hopper 24 at a selected speed controlled by the drive apparatus which is not shown, being a conventional variable speed power unit such as a SCR drive controlled motor. Feed hopper 24 contains a replenishable quantity of superabsorbent polymer media appropriately selected from the known superabsorbents such as crosslinked acrylics; starch-graft polymers; cross-linked glycote and cellulose esters; and generally refers to water swellable polymers capable of at least a ten fold absorption of aqueous fluids forming a gel which hold fluids by a physiochemical reaction that is resistant to fluid loss under pressure. In the preferred embodiment, the polymer is powder-like or particulate in nature and may be conveyed from a ground level supply, not shown, to the hopper by means of an auger or other suitable conveyor. Hopper 24 has a slot or gate 26 formed in the bottom thereof such that a measured amount of polymer media is deposited therethrough into the dimples 27 of roller 23. A cooperative doctor blade 28 wipes the surface of roller 23 to ensure that excess polymer is not carried by the roller 23.

The plastic film passes over roller 22 and is engaged with the surface of roll 23 at an elevation such that the polymer is maintained in the dimples 27, however the film disengages from roller 23 after the polymer has been deposited onto the film in discrete units. It will be appreciated that minimizing vibration in the film and film control of web tension results in less dissipation of the polymer as it is thereafter transported on the film. It will also be appreciated that the rate of rotation of the roller is proportionate to the speed of the film through the apparatus, therefore a counter 29 is connected to the roller 23 to measure the rotational speed of the roller. This measurement of speed is provided at the logic circuit 17 and can be used to monitor and control the speed of the drive apparatus.

Concurrently the fabric from roll 12 is dispensed over smoothing roller 31 to application roller 32 whereupon the fabric is aligned over the film and discrete units of polymer in position to be thermally bonded to the plastic film. It will be appreciated that appropriate control of vibration and tension as the fabric is overlaid onto the film and polymer is necessary to maintain the polymer units.

A pattern roller 33 has the film, polymer and fabric lamination entrained over substantially an upper quadrant thereof. The roller is a large diameter heated roller, which has a plurality of raised intersecting lands 36 formed thereon, such that the intersecting lands enclose an array of depressions 37 and such that only the raised lands 36 contact the underside of the plastic film. In the preferred embodiment the lands are linear and form square depression of about four square inches. The lands are about ⅛ of an inch in width, thus on a large diameter roller having a diameter of about fourteen and a half inches about nine rows of depression separated by lands would be formed on the roller 23. As will be appreciated, the pattern roller 33 and dispensing roller 23 must be synchronized by a chain drive or other means such that each polymer deposit on the film registers with a depression on the pattern roller as the film engages the lands. It is significant to note that the prior art Barrett device used a three inch pattern roller which was intolerant of synchronization errors and created some difficulty in operation.

The large diameter pattern roller 33 is heated by a supply of oil circulated internally of the roller such that the surface of the roller and in particular the lands are maintained at a precisely controllable temperature. A heated oil system 38 including an 36 kw heat transfer fluid heater heats the oil to a selected temperature, dependent on the characteristics of the film and non-woven fabric, between 250 and 400 degrees Fahrenheit and the oil is circulated to the center of the roller by appropriate plumbing connections. The oil temperature is monitored at the output of the heated oil system 38, at the input 34 to the pattern roll 33, and at the input to the heated oil system using platinum resistance heating probes. These measurements are displayed on the control panel of the machine and provided to the logic circuit 17 which controls the heater to maintain the oil temperature within a 1 degree tolerance of the temperature specified by the machine operator, therefore the temperature of the heated pattern roller is controlled within the same tolerance. The prior Barrett apparatus was never controlled with such specificity hence, the uneven application of heat over the roller lead to product degradation. It should also be appreciated that the use of a large diameter roller allows the plastic film to undergo heat transfer from the lands significantly more efficiently than a small diameter roller since heat can be applied in an area much greater than the nip between the pattern roller 33 and the associated pressure roller 43. Accordingly, the enhancement of the pattern roller temperature control and size allows the machine to be run at much higher production rates, yet at lower temperatures.

Figure 2:
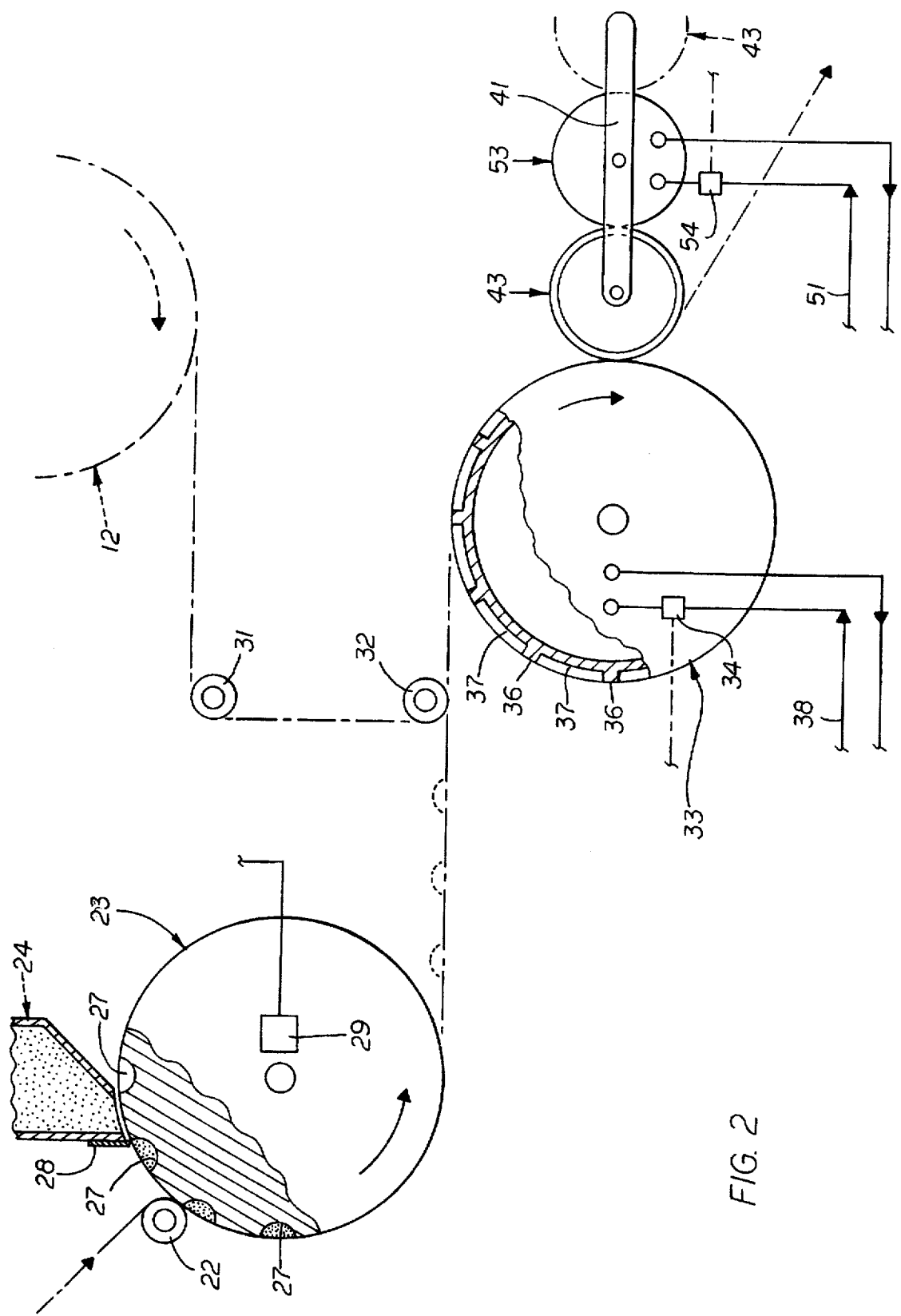
FIG. 2 is a detail view of the pressure roller carriage employed in the invention.

Pressure roller 43 and the associated components shown in FIGS. 1 and 2 represent another significant advance over the Barrett apparatus. Roller 43 is a rubber coated roller mounted on a linearly movable carriage 41 which is driven by one or more cooperative pneumatic cylinders 42. The pressure to the cylinders is finitely controlled, within the tolerance of a pneumatic system 46 having a regulator, on the control panel such that the desired pressure may be selected by the operator in a range between 20 PSI to 100 PSI in accordance with the medias being processed. A pressure sensor 44 in the pneumatic circuit to the cylinders 42 outputs its signal to the logic controller 17 and to a display on the control panel. Pneumatic pressure may be mathematically converted to applied pressure and this value may also be displayed for the operator, typically in ranges between 3 to 15 PLI. Pressure roller 43 is not driven and rotates about its longitudinal axis as a result of the frictional engagement with the laminate media passing between roller 33 and itself.

It is additionally desired to establish a temperature gradient across the film and fabric laminate by controlling the surface temperature of the pressure roller 43. This is accomplished using a cooling roller 53 mounted on carriage 41 for rotation about an axis parallel to the axis of the pressure roller. The axes of rotation are spaced such that the cooling roller 53 contacts the pressure roller 43 and is rotated with the roller 43 by the frictional engagement therewith. The cooling roller 53 is thermally conductive and has an internal cavity connected to a chilled water system 51 wherein distilled water and ethylene glycol in 70/30 solution are chilled and circulated into and out of the cooling roller 53. The chilled fluid is maintained at a finitely selected temperature which is measured and displayed to the operator via the PLC 17. The fluid temperature is measured using the same type platinum resistance temperature probes as used in the heated fluid. These probes are immersed in the fluid at the output of the chilled water system, the input 54 to the cooling roller 53, and the input to the chilled water system 51 with output connections to the PLC. The chilled water system may include an 8 ton BTU chilled water make up fluid chiller which cools and maintains the fluid at the desired setting between thirty and seventy degrees Fahrenheit. Accordingly, the cooling roller and chilled water therein act as a heat sink for the pressure roller to maintain the pressure roller at a predetermined temperature. Inasmuch as the pattern roller is maintained at a constant heated temperature within one or two degrees and the pressure roller is likewise maintained at a temperature within one or two degrees, there is no significant heat of process buildup on the rollers, therefor the product is being sealed in a pressure and temperature regime which is essentially constant, whereas the prior art could only make gross heating adjustments of plus or minus ten degrees F. of the selected heating temperature, without any controllable heat sink for the pressure roller. Additionally, product dwell time, on the order of 0.2 seconds, in the nip between the pattern roller and the pressure roller is a function of processing speed which is measures at dispersing roller 23 and output to PLC 17, thus all of the variables temperature, pressure, and dwell time are measurable and controllable in the instant apparatus. The significance of this is that the plastics used in the production of the product usually have an optimum sealing performance within a narrow temperature range of ten degrees F. or less. The prior art could not effectively maintain machine operation within this range or provide variable pressure or accurate dwell times. In the present invention, all of these parameters are sensed, processed in the PLC 17, displayed in the control panel and recorded on a selected media such as with a printer or electronic storage device.

Also associated with the pressure roller 43 is a film lift roller 61 which is vertically movable from a position beneath the interstice between the pressure roller 43 and pattern roller 33 to a position at an elevation higher than the pattern roller 33. It will be appreciated that if the process is stopped for some reason, the plastic film should not be allowed to stop atop the heated pattern roller, therefore, the lift roller 61 is synchronized with the pressure roller carriage 41 such that when cylinders 42 retract the pressure roller from engagement with the pattern roller, a set of cylinders 62 are actuated to raise the laminate media above the heated roller.

Once the film, polymer, and fabric have passed through the nip the film has been bonded to the fabric along the sealing lines formed by the lands and the pressure roller, thereby forming a continuous sheet of individual cells with a defined quantity of superabsorbent polymer within each cell. The continuous sheet is led to a take up roll 71 over a series of rollers including a dancer roller assembly 63 and a pair of smoothing rollers 64 and 66. The take up roll is supported on a chuckless roll support to facilitate ease of removal. The take up roll is driven by a motor not shown at a rate controlled in part by the dancer roll assembly 63 which is responsive to the output tension in the laminated cellular sheet and provides a control signal to the motor. It should be noted that at this point the polymer media is encased and the cells may be vibrated without fear of contaminating the seal surfaces or loss of polymer. In fact it is desirable at this point to disperse the polymer in the cell although it is not necessary to do so.

From the forgoing, it should be clear that we have devised an apparatus and method for use which greatly improves the ability to produce cellular refrigerant media as described herein. Specifically, we have improved the maximum processing speed from 30 feet per minute to 100 feet per mute. We have improved the input tension control such that powdering of the film in the area to be sealed does not occur nor does dissipation of the superabsorbent polymer. We have provided sealing pressure control where there was none. We have provided finite temperature control which maintains sealing temperature within ±1 degree F. where the prior art experienced temperature fluctuations which lead to unusable product. All of which, when placed in a production setting, increased production by over 500% over the Barrett machine. Accordingly, the present invention represents a major improvement over the art as known to us.

While we have shown our invention in but one form the forgoing description was presented for the purposes of illustration rather than limitation and the invention and the practice thereof is to be defined by reference to the appended claims.

What we claim is:

1. Apparatus for producing a continuous composite fabric sheet having discrete cells, each cell containing a measured volume of a superabsorbent polymer media, comprising:

(a) means for continuously feeding a thermo-formable sheet of media from a supply roll of such media;

(b) means for dispensing a measured quantity of a superabsorbent polymer media onto an upper surface of said sheet in discrete units spaced transversely and longitudinally on said sheet;

(c) means for continuously supplying a sheet of permeable fabric media from a supply roll of such media in horizontally aligned juxtaposition superjacent said thermo-formable sheet with said discrete units of said polymer media therebetween;

(d) means for maintaining a predetermined tension on said permeable and thermo-formable sheet to prevent dissipation of said polymer from said units;

(e) a heated pattern roller having a raised intersecting pattern formed on the surface thereof and a means for providing precise heat control thereto, said heated pattern defining individual cell dimensions associated with each of said units said pattern roller mounted for rotation about a first axis transverse to said sheets such that said sheets are carried on said pattern roll over a portion of said rotation;

(f) pressure roller means for applying a predetermined pressure to said sheets against said pattern roll such that said fabric sheet and said thermo-formable sheet are integrated by thermal bonds formed along said pattern to form a composite sheet with said superabsorbent polymer confined within cells defined by said thermal bonds;

(g) means for controlling the temperature differential between said heated pattern roller and said pressure roll means; and, (h) means for controlling the rate of feed and supply of said sheets over said pattern roll.

2. Apparatus as defined in claim 1 wherein said pressure roll means comprises:

(a) a carriage mounted for selective reciprocal motion along a plane radial of said heated pattern roll between a pattern roll engaging position and a retracted position;

(b) a pressure roll mounted on said carriage for driven rotation about a second axis parallel to said first axis; and, (c) a linear actuator mounted to said carriage to selectively move said carriage between said engaging position and said retracted position and to apply selected pressure to said pressure roll against said pattern roll.

3. Apparatus as defined in claim 2 wherein said temperature differential controlling means comprises:

(a) a smooth thermally conductive roller mounted on said carriage for rotation about a third axis parallel to said second axis such that said pressure roller and said thermally conductive roller are in rolling contact along a common tangent plane; and, (b) means for circulating a cooling fluid within said thermally conductive roller at a temperature sufficient to maintain said thermally conductive roller and said pressure roller at selected predetermined temperatures.

4. Apparatus as defined in claim 2 wherein said pressure roller is rubber coated.

5. Apparatus as defined in claim 1, wherein said tension maintaining means comprises:

(a) a first sensor for detecting the amount of media left on said supply roll of thermo-formable media;

(b) a second sensor for detecting the amount of media left on said supply roll of fabric media;

(c) a third sensor for detecting the rate at which said sheets traverse said dispensing means;

(d) brake means for independently controlling the rotation of said supply roll of fabric media and said supply roll of thermo-formable media; and, (e) computational means receiving input signals from each of said sensors for determining the appropriate rate of rotation of each of said supply rolls of media in accordance with the rate at which said sheets traverse said dispensing means and having an output to said brake means for controlling brake means in accordance with said determined appropriate rate to maintain a predetermined tension in said fabric.

6. Apparatus as defined in claim 5 further comprising a take-up roll mounted for rotation about a fourth axis parallel to said third axis and spaced therefrom; and; tension control means for controlling the speed of said take-up roll.

7. Apparatus as defined in claim 6 wherein said tension control means comprises a dancer roll assembly having said composite sheet entrained thereof such that said dancer roll assembly is movable in accordance with the tension in said composite sheet to provide a signal to a controller for controlling the speed of said take-up roll.

8. Apparatus as defined in claim 5 wherein said first and second sensors are ultrasonic sensors positioned at a fixed distance from each of said supply rolls.

9. Apparatus as defined in claim 8 wherein said means for feeding is a cradle having supports for said supply roll and means for moving said roll axially within said cradle.

10. Apparatus as defined in claim 8 wherein said means for supplying is a cradle having supports for said supply roll and means for moving said roll axially within said cradle.

11. Apparatus as defined in claim 1 further comprising a crane for delivering supply rolls to said means for feeding and means for supplying.

12. Apparatus as defined in claim 1 wherein said pattern roller is a large diameter roller relative to the size of the pattern formed thereon.

13. A method of manufacturing a refrigerant media from a thermo-formable layer of sheet media and a semi-permeable layer of sheet media to form discrete cells containing a measured quantity of superabsorbent polymer, comprising the steps of:

(a) supplying each of said layers from a sheet of such media formed in a roll such that the supplied sheet is maintained under tension to prevent significant vibration;

(b) metering a measured quantity of a selected polymer onto a plurality of discrete locations on an upper surface of said impermeable layer as it is supplied;

(c) measuring the speed at which said thermo-formable layer is supplied;

(d) aligning said semi-permeable layer atop said thermo-formable layer and said polymer as said layers are supplied;

(e) entraining said aligned layers partially about a large diameter heated roller having a pattern of intersecting lands thereon such that a plurality of recesses are defined in alignment with each discrete location of said polymer;

(f) controlling the temperature of said heated roller to within a sealing tolerance of said layers by circulating a heated fluid through said heated roller;

(g) applying a controlled pressure to said aligned layers while in contact with said heated roller by a pressure roller such that said layers are bonded to one another along said lands;

(h) maintaining the temperature of said pressure roller at a constant temperature; and (i) collecting said bonded layers.

14. The method of claim 13 wherein said heated roller is maintained at a selected temperature between about 250 and about 400 degrees Fahrenheit.

15. The method as defined in claim 14 wherein said pressure roller is maintained at a finite temperature of between about 35 and about 70 degrees Fahrenheit.

16. The method as defined in claim 15 wherein said pressure is maintained at a selected temperature of between about 3 and about 15 pounds per linear inch.

17. The method as defined in claim 13 wherein said pressure roller is maintained at a finite temperature of between about 35 and about 70 degrees Fahrenheit.

18. The method as defined in claim 17 wherein said pressure roller is maintained a said finite temperature by a cooling roller frictionally engaging said pressure roller and maintained at a selected temperature by circulation of chilled fluid therethrough such that it acts as a heat sink for said pressure roller.

19. The method as defined in claim 13 wherein said pressure is maintained at a selected pressure of between about 3 and about 15 pounds per linear inch.

* * * * *

UNITED STATES PATENT AND TRADEMARK OFFICE
CERTIFICATE OF CORRECTION

Figure 4:
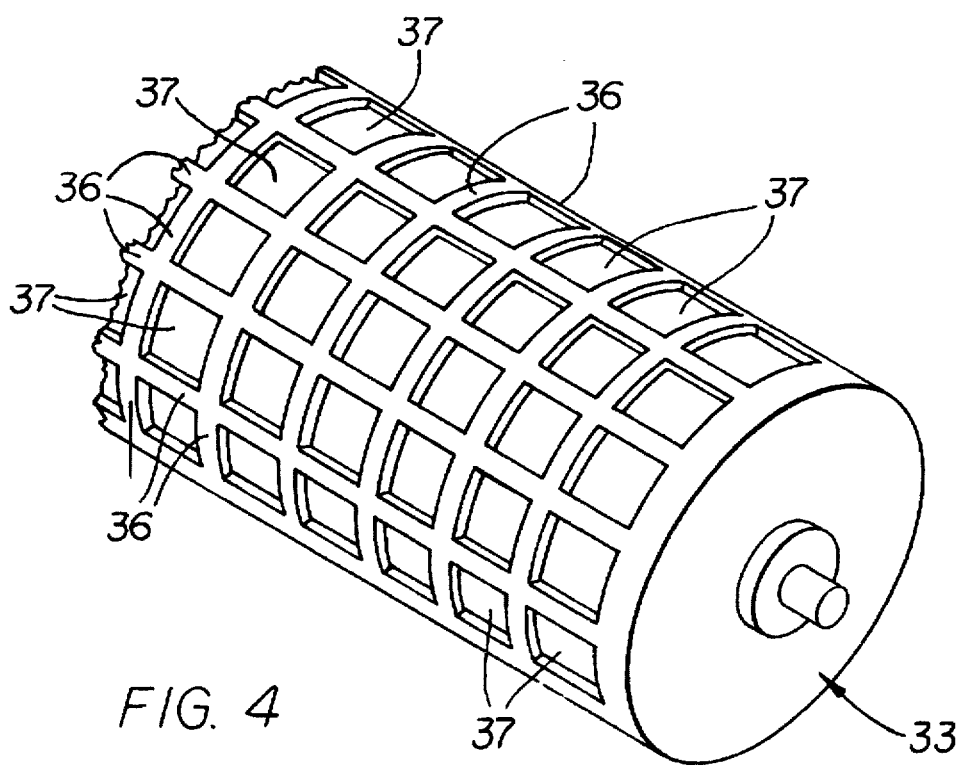
FIG. 4 is a perspective view of a portion of the heated pattern roller.

PATENT NO.  : 5,628,845
DATED       : May 13, 1997
INVENTOR(S) : Joseph C.J. Murray
              Jonathan S. Brown It is certified that error appears in the above-identified patent and that said Letters Patent are hereby corrected as shown below:

In column 3, line 20, change " FIG. 3 " to - FIG. 4 -.
In column 6, line 14, change " mute" to - minute -.
In column 6, line 20, change " +1 " to - +/-1 -.

Signed and Sealed this

Thirtieth Day of September, 1997

Attest:

BRUCE LEHMAN

Attesting Officer

Commissioner of Patents and Trademarks